May 3, 1927.
G. C. HENDERSON
FIFTH WHEEL ASSEMBLY
Filed Aug. 25, 1924
1,627,176
4 Sheets-Sheet 1
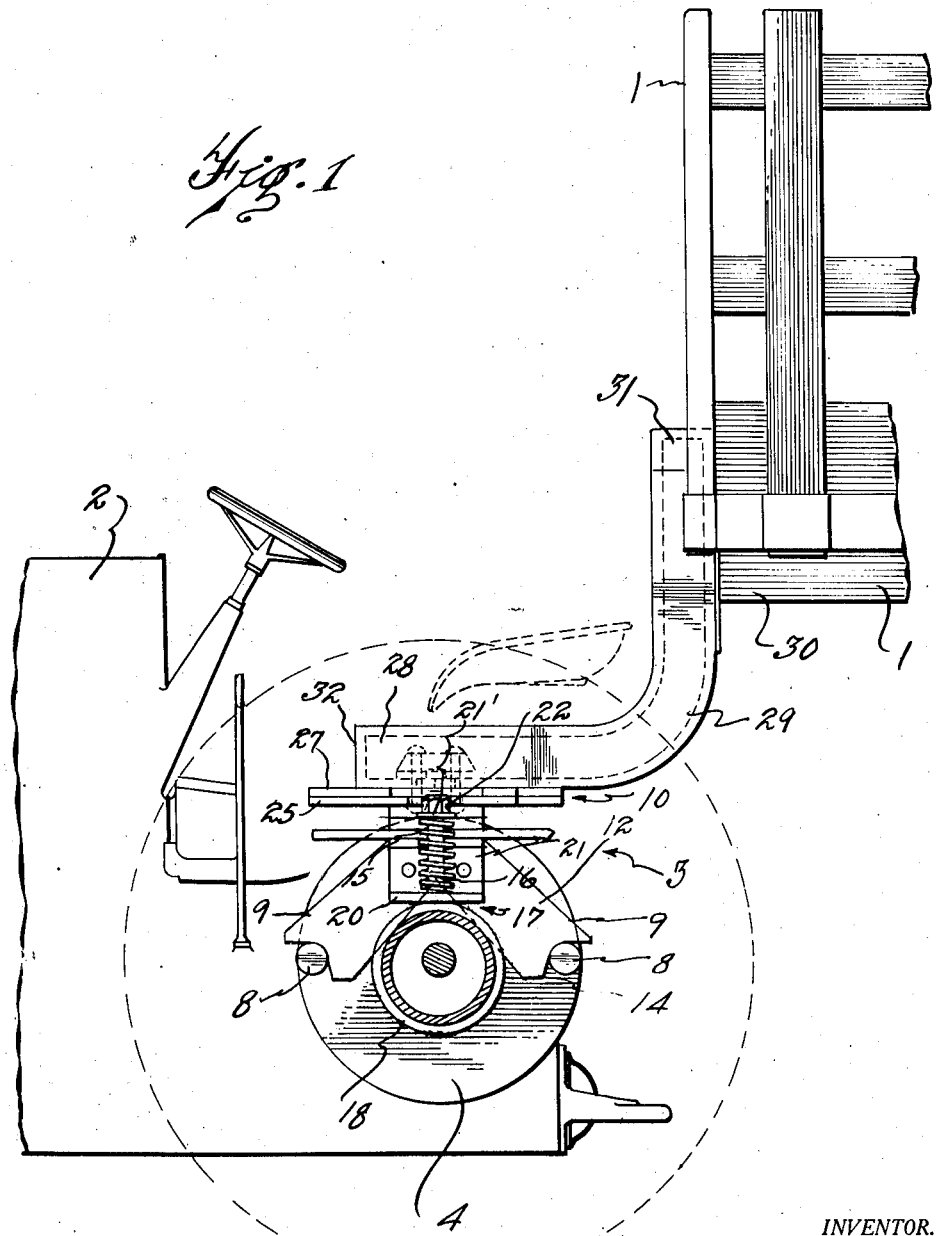

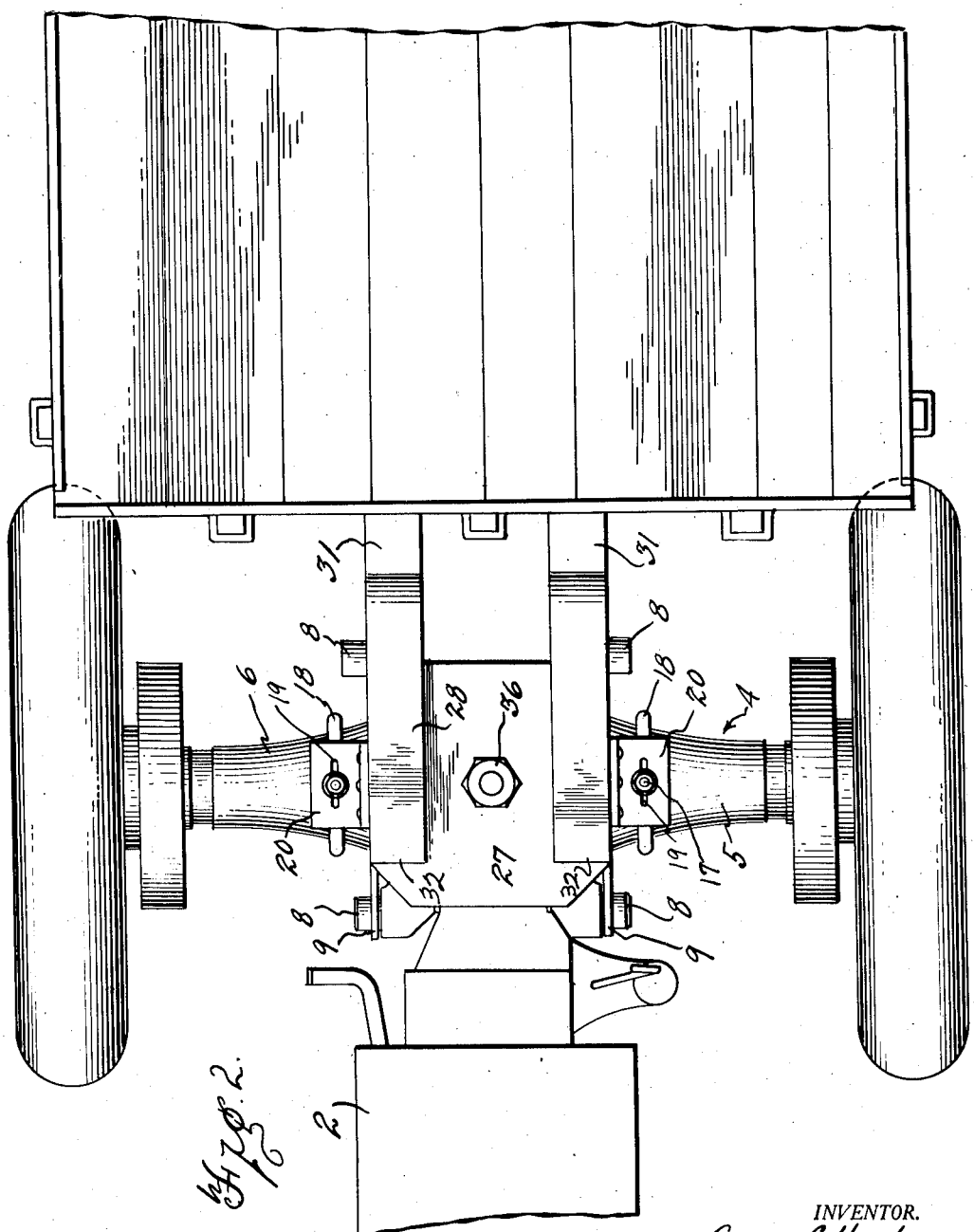

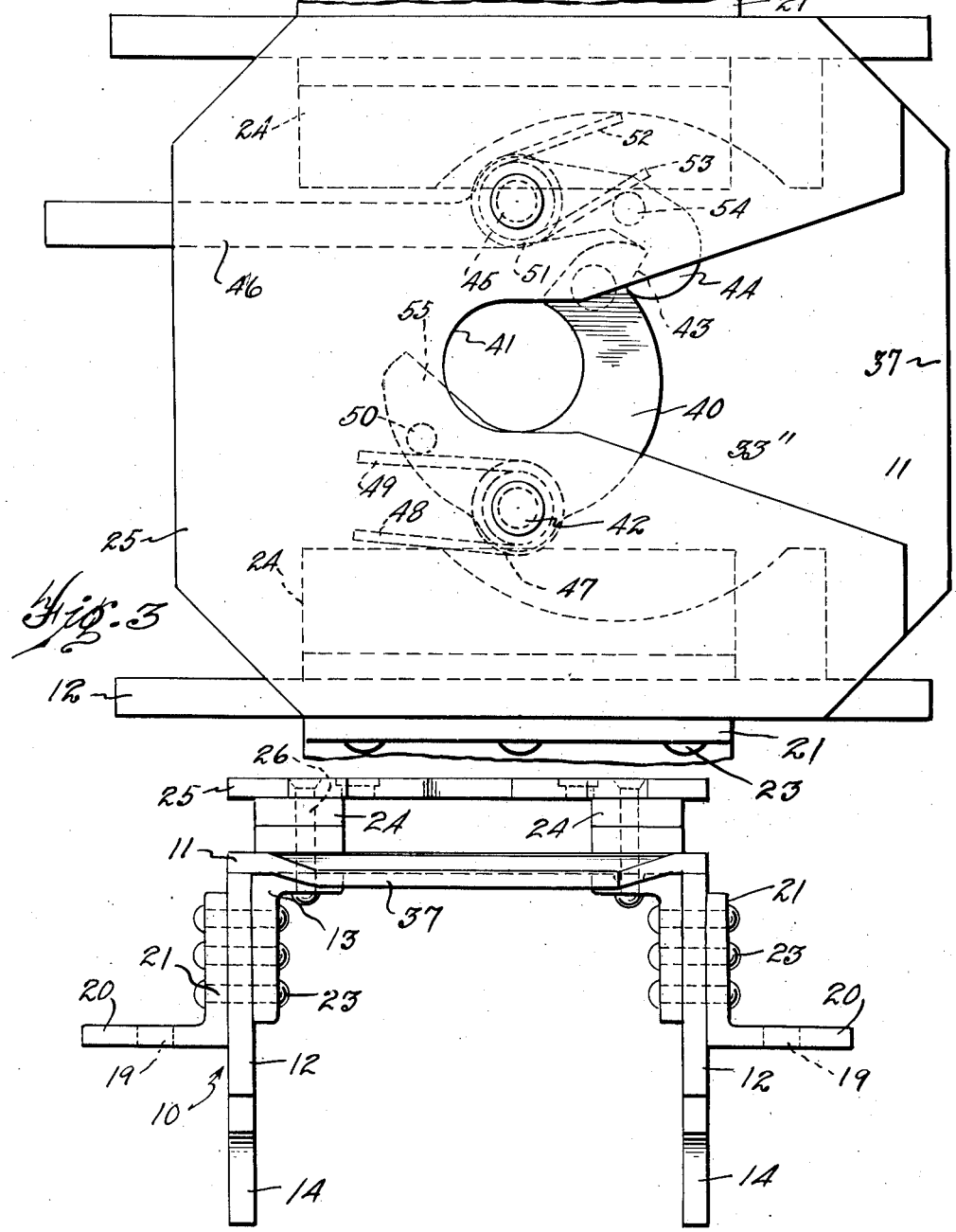

May 3, 1927.  G. C. HENDERSON  1,627,176
FIFTH WHEEL ASSEMBLY
Filed Aug. 25, 1924   4 Sheets-Sheet 4
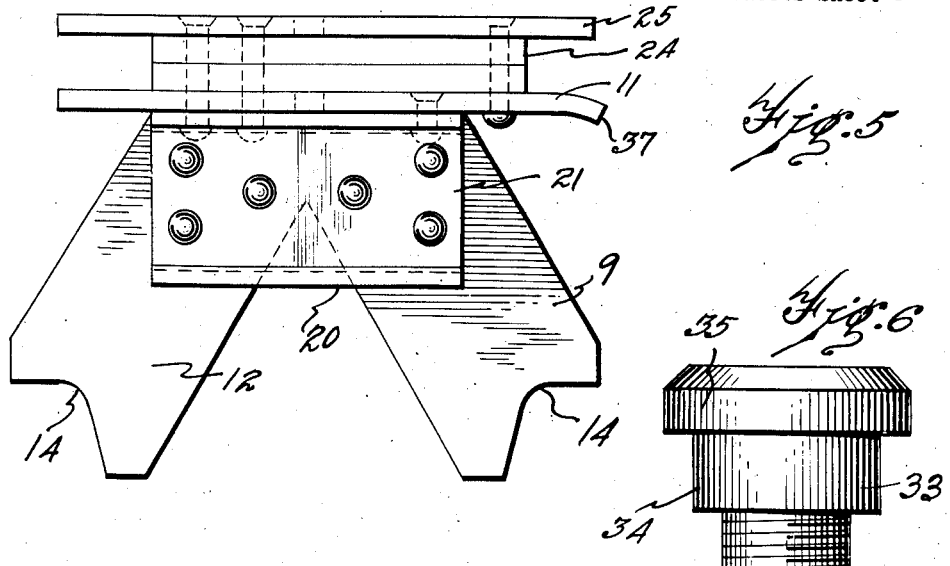
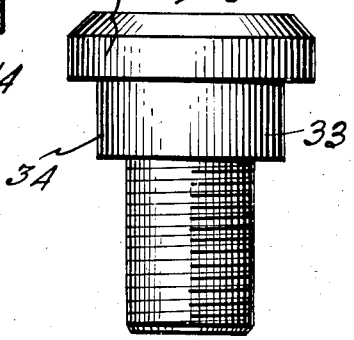
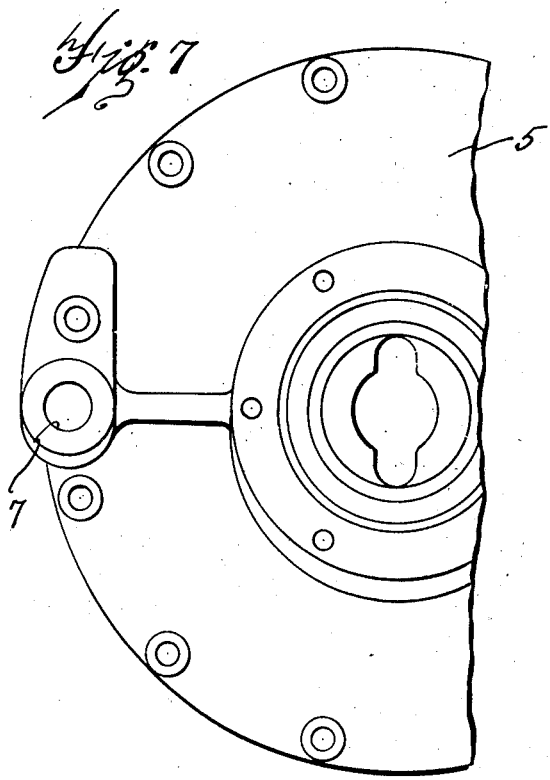
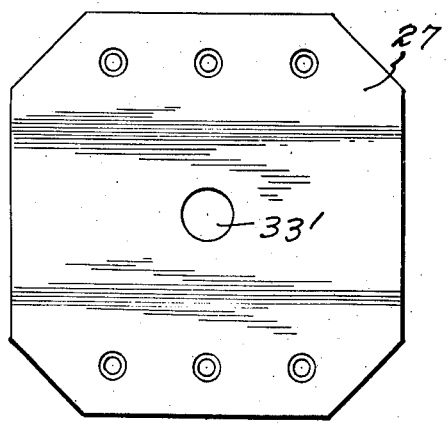
INVENTOR.
George C. Henderson
BY Whittemore Hulbert
Whittemore Belknap
ATTORNEYS Patented May 3, 1927.

1,627,176

UNITED STATES PATENT OFFICE.

GEORGE C. HENDERSON, OF DETROIT, MICHIGAN, ASSIGNOR TO WHITEHEAD & KALES COMPANY, OF RIVER ROUGE, MICHIGAN, A CORPORATION OF MICHIGAN.

FIFTH-WHEEL ASSEMBLY.

Application filed August 25, 1924. Serial No. 734,088.

This invention relates generally to draft appliances and refers more particularly to devices for coupling two wheel trailers and the like to tractors.

One of the essential objects of the invention is to provide a coupling device of this type that will permit the forward end of the trailer to pivot upon the tractor body while at the same time to rock or move vertically relative to the tractor body when traveling over uneven surfaces.

A further object is to provide a coupling device which serves as a stabilizer for effectively preventing the front end of the tractor from rearing up and injuring the driver when pulling a heavy load or when the rear drive wheels are mired.

Another object is to provide simple and effective coupling means which will operate automatically to connect the sections of the fifth wheel together and which may be easily and quickly adjusted to release the sections for disconnecting the trailer from the tractor.

With the above and other objects in view the invention consists in certain novel features of construction, combinations and arrangements of parts as will be more fully described and particularly pointed out in the appended claims.

In the accompanying drawings;

Figure 1 is a fragmentary side elevation of a tractor and trailer and showing my invention applied thereto.

Figure 2 is a top plan view thereof.

Figure 3 is a top plan view of a portion of the draft appliance.

Figure 4 is a front elevation of the construction shown in Figure 3 without the coupling mechanism.

Figure 5 is a side elevation of the construction shown in Figure 4.

Figure 3 is a detail view of the king bolt in its inverted position.

Figure 7 is a fragmentary end view of one of the sections of the rear axle housing.

Figure 8 is a detail top plan view of the upper section of the fifth wheel.

Referring now to the drawings in which like characters of reference designate corresponding parts throughout the several views, the numeral 1 designates a trailer, preferably of the two wheel type, that is coupled at its forward end to a tractor 2 by means of a fifth wheel assembly designated generally by the numeral 3.

In order that the forward end of the trailer may move vertically relative to the rear end of the tractor when traveling over an uneven surface, while at the time time, the front end of the tractor will be effectively prevented from rearing up and injuring the driver due to the tendency of the drive worm to travel up on the worm wheel at the rear end of the tractor when pulling a heavy load or when the rear drive wheels have been mired, the fifth wheel assembly is preferably rockably mounted upon the rear axle housing 4 of the tractor. As shown, the sections 5 and 6 of the rear axle housing are preferably provided at diametrically opposite sides with threaded sockets 7 which receive suitable pins 8 for supporting the diverging ends 9 of an inverted substantially U-shaped rocker 10 that preferably straddles the differential housing of the tractor body. Inasmuch as the pins 8 are located upon diametrically opposite sides of the rear axle housing, it will be readily apparent that the trailer resting on the forward pins will effectively prevent the front end of the tractor rearing up as described.

This rocker 10 may be any shape desired but is preferably formed of the flat top plate 11 and the two inverted substantially V-shaped end plates 12. These end plates are preferably secured to the top plate by means of the L-shaped brackets 13 and are cut away at their lower ends as shown at 14 to receive the pins 8.

For normally holding the rocker in a horizontal position upon the pins 8, I preferably provide suitable coil springs 15 that are sleeved upon the shanks 16 of two yokes 17. As shown, the loop portions 18 of the yokes surround the sections 5 and 6 of the rear axle housing, while the shanks preferably extend upwardly through suitable elongated openings 19 in the horizontal portions 20 of L-shaped brackets 21 secured to the end plates 12 of the rocket. The lower ends of the springs 15 preferably rest upon the base portions 20 of the brackets 21, while the upper ends of the springs preferably bear against suitable washers 21' that are held upon the shanks 16 by means of suitable nuts 22. As shown, the brackets 13 and 21 are preferably secured to the end plates 12 of the rocker by the same bolts or rivets 23.

Mounted on the top plate 11 of the rocker are suitable spacer blocks 24 that extend longitudinally of the top plate and support the lower section 25 of the fifth wheel. These blocks are preferably located at the opposite side edges of the top plate and are preferably secured thereto by means of bolts 26 which extend through the lower section 25 of the fifth wheel. The upper section 27 of the fifth wheel preferably rests upon the lower section 25 and is rigidly secured to the horizontal portions 28 of L-shaped supporting posts 29 which are rigidly secured to the forward end of the trailer frame 30. These posts may be constructed of any suitable material but are preferably hollow and have closed ends 31 and 32 respectively.

In order that the sections 25 and 27 respectively of the fifth wheel may be easily and quickly connected or disconnected as desired, I preferably provide a relatively short king bolt 33 that extends through an opening 33' in the central portion of the upper section 27 and engages the rounded inner end of a substantially V-shaped opening 33'' in the lower section 25. As shown, this king bolt is preferably provided with an enlarged pivot portion 34 and a head 35 and is secured to the upper section 27 of the fifth wheel by means of a suitable nut 36. The pivot portion 34 bears against the lower face of the upper section while the head 35 is normally disposed between the lower section 25 and the top plate 11 of the rocker. To guide the head of the king bolt between the rocker and lower section of the fifth wheel, the rear end portion of the top plate 11 is preferably bent downwardly as shown at 37.

For holding the king bolt in position at the inner end of the opening 33' in the lower section 25 of the fifth wheel, I preferably provide a substantially U-shaped jaw 40 that is adapted to cooperate with the curved inner end 41 of the opening to form an eye to receive the king bolt. As shown, this jaw is preferably pivoted at one side of the opening 33' on a pin 42 extending between the top plate 11 and the lower section 25 of the fifth wheel and is preferably provided at its outer free end with a shoulder 43 that is adapted to be engaged by a suitable hook 44 pivoted on a pin 45 at the opposite side of the opening 33' for holding the jaw 40 in closed position.

In order that the jaw may be released quickly, the hook 44 is preferably provided beyond the pivot 45, with a relatively long extension 46 which may be readily grasped for manipulating the hook. This jaw 40 is normally held in open position by means of a coil spring 47 that surrounds the pin 42 and is provided with arms 48 and 49 respectively that bear against the adjacent blocks 24 and a pin 50 carried by the jaw 40, while the hook 44 is normally held in the path of the jaw 40 by means of a coil spring 51 so that it will automatically hold the same when moved to closed position. As shown, this coil spring 51 surrounds the pivot 45 for the hook and is provided with arms 52 and 53 respectively that bear against the adjacent blocks 24 and a pin 54 carried by the hook.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. The combination with a tractor having a sectional rear axle housing and a differential housing between the sections of the axle housing, of a rocker straddling the differential housing of the tractor, pins projecting from the sections of the rear axle housing in a plane substantially parallel with the major portions thereof for supporting the said rocker, and a pivot for a trailer mounted on the rocker.

2. The combination with a tractor and a trailer, said tractor having a sectional rear axle housing and a differential housing between the sections of the axle housing, of a rocker straddling the differential housing of the tractor having diverging end portions, pins projecting from the sections of the rear axle housing in a plane substantially parallel with the major portions thereof for supporting the diverging end portions of the rocker, a fifth wheel mounted on the rocker, and means for connecting one section of the fifth wheel to the trailer.

3. The combination with a tractor having a sectional rear axle housing and a differential housing between said sections, of a rocker straddling the differential housing, pins projecting from the axle sections in a plane substantially parallel with the major portions thereof for supporting the rocker, means for yieldably holding the rocker on the pins, and a fifth wheel having sections connected respectively to said rocker and trailer.

4. The combination with a tractor having a sectional rear axle housing and a differential housing between said sections, of a rocker straddling the differential housing, pins projecting from the axle sections supporting the rocker, brackets secured to the rocker having lateral flanges, yokes embracing the rear axle sections having shank portions extending through the lateral flanges of the brackets, and springs engaging the yokes and bracket flanges for holding the rocker on the pins.

5. The combination with a tractor having a sectional rear axle housing, and a two wheeled trailer, of pins rigidly mounted upon diametrically opposite sides of the sections of the rear axle housing, and a support for the forward end of said trailer engageable with certain of said pins for preventing the forward end of the tractor from rearing up.

6. The combination with a tractor having a sectional rear axle housing and a differential housing between the sections of the axle housing, of pins rigidly mounted upon diametrically opposite sides of the rear axle housing sections, a rocker engageable with certain of said pins for preventing the forward end of said tractor from rearing up, and a pivot for a trailer on said rocker.

7. The combination with a tractor, of a trailer having depending supporting posts at the forward end thereof, said posts having horizontal portions at their lower ends, a rocker mounted on the tractor, and a fifth wheel having sections secured respectively to said rocker and the horizontal portions of said posts.

8. The combination with a tractor having a sectional rear axle housing and a differential housing between said sections, of pins projecting directly from the axle sections at diametrically opposite sides thereof and rigidly mounted thereon, a rocker straddling the differential housing having depending legs resting on said pins, and means for yieldably holding the rocker legs on said pins.

9. The combination with a tractor having a sectional rear axle housing, of pins projecting directly from the sections of said housing at diametrically opposite sides thereof and rigidly mounted thereon, and means straddling a portion of the tractor and engageable with certain of said pins for preventing the forward end of the tractor from rearing up.

10. The combination with a tractor having a sectional rear axle housing and a differential housing between said sections, of pins projecting rigidly from the axle sections at diametrically opposite sides thereof, a rocker straddling the differential housing having depending legs resting on said pins, brackets secured to the sides of the rocker, yokes mounted on the axle sections having shanks extending through said brackets, and yieldable means associated with said shanks upon one side of said brackets for normally holding the rocker legs on said pins.

In testimony whereof I affix my signature.

GEORGE C. HENDERSON.